United States Patent [19]

Idogaki et al.

[11] Patent Number: 4,533,847

[45] Date of Patent: Aug. 6, 1985

[54] ROTARY DRIVE APPARATUS WITH PERMANENT MAGNETS ON THE ROTOR AND STATOR

[75] Inventors: Takaharu Idogaki; Ikuo Hayashi, both of Okazaki; Hisasi Kawai, Toyohashi; Kyo Hattori, Susono; Kazuhiro Sakurai, Gotenba, all of Japan

[73] Assignee: Nippon Soken, Inc., Nishio, Japan

[21] Appl. No.: 616,187

[22] Filed: Jun. 1, 1984

[30] Foreign Application Priority Data

Jun. 2, 1983 [JP] Japan ................................ 58-97008

[51] Int. Cl.$^3$ ................................ H02K 1/00

[52] U.S. Cl. ................................ 310/181; 310/156; 310/154; 310/36

[58] Field of Search ............... 310/152, 154, 156, 181, 310/184, 190, 191, 193, 194, 254, 36; 322/46

[56] References Cited

U.S. PATENT DOCUMENTS

| | | | |
|---|---|---|---|
| 3,293,467 | 12/1966 | Favre | 310/156 |
| 3,433,987 | 3/1969 | Thees | 310/156 |
| 3,434,082 | 3/1969 | Montagu | 310/156 X |
| 3,471,725 | 10/1969 | Moret et al. | 310/156 X |
| 3,770,998 | 11/1973 | Haydon et al. | 310/156 |
| 3,862,445 | 1/1975 | Volkrodt | 310/181 X |
| 3,900,749 | 8/1975 | Carriker | 310/156 |
| 4,006,374 | 2/1977 | Nakagawa | 310/156 X |
| 4,447,793 | 5/1984 | Gray | 310/156 X |

*Primary Examiner*—Mark O. Budd

*Attorney, Agent, or Firm*—Cushman, Darby & Cushman

[57] ABSTRACT

A rotary drive apparatus including a frame having at least three holes; a yoke having a center portion and two side bar portions on opposite sides of the center portion, the center portion having a hole, coils mounted on the side bar portions of the yoke, a collar having a bore and being tightly mounted on the surface of the hole of the yoke, magnetic parameter changing elements being mounted on the surface of the bore of the collar, and a rotor having magnetic poles in the radial direction and being inserted into the bore of the collar with a predetermined clearance. In the apparatus, a first hole of the frame is parallel to a first direction of the apparatus and has a cross-section for tightly receiving the center portion of the yoke, and a second and third holes of the frame are in a second direction perpendicularly intersecting the first direction and being concentric with each other oppositely the first hole, the center portion of the yoke being fit into the first hole. The position of the collar is adjusted through the second hole during the adjustment, and the third hole passes a shaft connected to one end of the rotor.

20 Claims, 10 Drawing Figures

ROTARY DRIVE APPARATUS WITH PERMANENT MAGNETS ON THE ROTOR AND STATOR

BACKGROUND OF THE INVENTION (1) Field of the Invention

The present invention relates to a rotary drive apparatus, more particularly, to a rotary drive apparatus which can be used, for example, as an actuator of a solenoid valve for controlling the idling speed of an automobile engine.

(2) Description of the Prior Art

In a conventional rotary drive apparatuses provided with a rotary proportional solenoid and a return spring, a rotor is controlled to a predetermined rotation angle defined by the electromagnetic force generated by the solenoid coil and the force of the return spring. Mechanical return springs, however, require troublesome fixing and adjustment to ensure spring linear characteristics. Also, there is a limit to the service life of the rotary drive apparatus.

To overcome this problem, there is known for example, in U.S. Ser. No. 499,402, a rotary drive apparatus which can control the rotation angle of the rotor with a high reliability by using an electromagnetic return force instead of a mechanical return spring. The apparatus has a long service life and relatively simple construction, however, still can be improved in respect to production of its components, assembly, and adjustment.

SUMMARY OF THE INVENTION

An object of the present invention is to provide a rotary drive apparatus which can be easily manufactured and adjusted and can maintain a predetermined performance.

According to the present invention, there is provided a rotary drive apparatus comprising: a frame having at least three holes; yoke means having a center portion and two side bar portions on oppposite sides of the center portion, the center portion having a hole; coil means mounted on the side bar portions of the yoke means; collar means having a bore and being tightly mounted on the surface of the hole of the yoke means; magnetic parameter changing means being mounted on the surface of the bore of the collar means; and rotor means having magnetic poles in the radial direction and being inserted into the bore of the collar means with a predetermined clearance; wherein a first hole of the frame is parallel to a first direction of the apparatus and has a cross-section for tightly receiving the center portion of the yoke means; second and third holes of the frame are in a second direction perpendicularly intersecting the first direction and being concentric with each other oppositely the first hole; the center portion of the yoke means being fit into the first hole; the position of the collar means is adjusted through the second hole during the adjustment, and the third hole passes a shaft connected to one end of the rotor means.

BRIEF DESCRIPTION OF THE DRAWINGS

Other objects and features of the present invention will be clearly understood from the following description with reference to the accompanying drawings, wherein.

DESCRIPTION OF THE PREFERRED EMBODIMENT

Before describing preferred embodiments of the present invention, a prior art rotary drive apparatus will be briefly explained for reference purposes.

Figure 3:
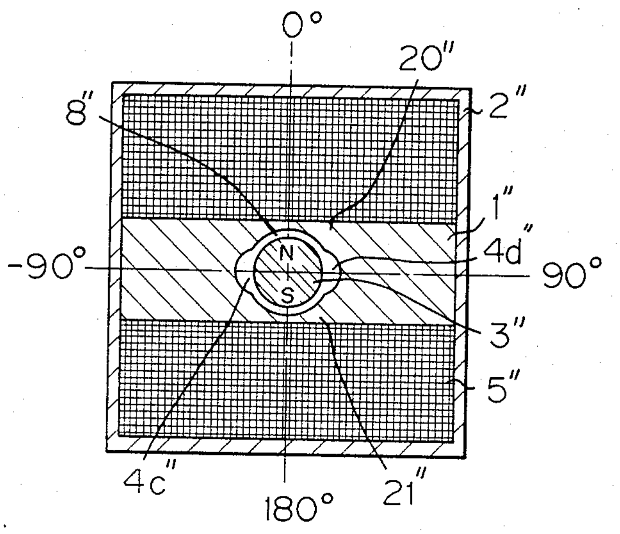
Fig. 3 PRIOR ART
FIG. 3 is a top sectional view of a prior art rotary drive apparatus.

FIG. 3 is a top sectional view of a prior art rotary drive apparatus disclosed in U.S. Ser. No. 499,402. The rotary drive apparatus includes a yoke 1″ of a ferromagnetic material, an iron case 2″ forming a closed magnetic path with the yoke 1″, and a permanent magnet rotor 3″ inserted into a hole 8″ formed within the yoke 1″ perpendicular to the longitudinal axis of the yoke 1″. The hole 8″ has large side concavities **4*c*″ and 4*d*″. Accordingly, there is a large gap between the rotor 3″ and the yoke 1″ along the longitudinal axis and a small gap between the rotor 3″ and the yoke 1″ (narrow portions 20″ and 21**″) in the 0°–180° direction in FIG. 3.

In operation, when the coil 5″ is not energized, the rotor 3″ rests with its N and S poles in the direction of the lowest potential energy. In other words, the rotor 3″ rests with its N-S axis in the direction of least magnetic resistance. Due to the concavities **4*c*″ and 4*d*″ which are magnetic parameter changing elements, the minimum magnetic resistance is in the direction perpendicular to the longitudinal axis at the yoke 3″, i.e., the 0°–180° direction in FIG. 3, while the maximum magnetic resistance is in the direction parallel to the longitudinal axis of the yoke 3**″, i.e., the −90°-(+90°) direction in FIG. 3.

When the coil 5″ is energized, the rotor 3″ rotates to a direction within 90° to −90°, the exact direction being determined by the point where the electromagnetic force generated by the coil 5″ equals the magnetic spring force. Accordingly, the rotation angle of the rotor 3″ can be controlled by the amplitude and the negative or positive nature of the current applied to the coil 5″.

As clear from the above, the concavities **4*c*″ and 4*d*″ function as a magnetic return spring, consequently, the rotary drive apparatus is free from the problems of mechanical return springs. This rotary drive apparatus, however, is difficult to construct and adjust. For example, the hole 8**″ must be bored in this yoke perfectly concentrically, which requires a high machining accuracy. Also, it is difficult to adjust the position of the concavities 4c″ and 4d″ when assembling the drive shaft of the rotary drive apparatus to solenoid valve or the like. Other troublesome work is also required, for example, the yoke 1″ must be treated to prevent rusting.

Regarding the yoke 1″ itself, it is difficult to machine to the proper thickness the narrow portions 20″ and 21″. The narrow portions must be machined with a high accuracy, because of their importance in defining the closed magnetic path characteristics.

Figure 1:
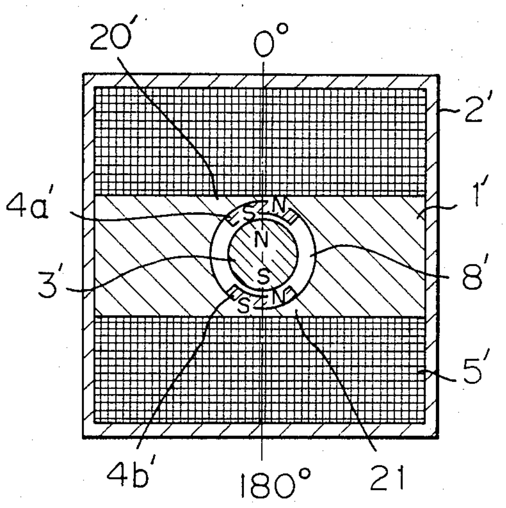
FIG. 1 is a top sectional view of a rotary drive apparatus.

A proposal rotary drive apparatus will be explained. FIG. 1 is a top sectional view of a proposal rotary drive apparatus. The rotary drive apparatus includes a yoke 1′ of ferromagnetic material, an iron case 2′ forming a closed magnetic path together with the yoke 1′, and a permanent magnet rotor 3′ inserted into a hole 8′ positioned within a part of the yoke 1′. The rotary drive apparatus further includes permanent magnets 4a′ and 4b′. The permanent magnets 4a′ and 4b′ are spaced a predetermined distance from the rotor 3′ and have the poles shown in FIG. 1. In addition, the rotary drive apparatus includes a coil 5′ wound around the yoke 1′.

In operation, when the coil 5′ is not energized, the rotor 3′ rests with its N and S poles in the 0°–180° direction, as shown in FIG. 1, due to the attraction of the fixed magnets 4a′ and 4b′. When the coil 5′ is energized, this stationary state is broken and the rotor 3′ begins to turn. The rotor 3′ stops at the position where the electromagnetic torque acting on the rotor 3′ equals the force of the magnets 4a′ and 4b′. As clearly understood, by applying positive current or negative current to the coil 5′, the rotor 3′ can be rotated within a range of +90° to −90° from the angle 0° in FIG. 1. The rotation angle of the rotor 3′ depends on the current applied to the coil 5′.

The main difference between the rotary drive apparatuses shown in FIGS. 1 and 3 are that while the first apparatus has two stationary position, the second has only one. Also, while the first apparatus has two concavities 4c″ and 4d″, the second has two permanent magnets 4a′ and 4b′ in the hole 8′.

Figure 2:
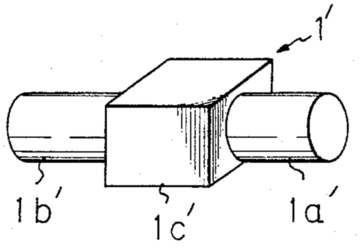
FIG. 2 is a perspective view of a yoke of the rotary drive apparatus in FIG. 1.

As clear from the above, the magnets 4a′ and 4b′ function as a magnetic return spring, consequently, the rotary drive apparatus is also free from the problems of mechanical return springs. This rotary drive apparatus, however, is also difficult to construct and adjust. For example, it uses a ferromagnetic yoke 1′ as shown in FIG. 2, which incorporates a center block portion 1c′ and two column portions 1a′ and 1b′. The hole 8′ must be bored in this yoke perfectly concentrically, which requires a high machining accuracy. Also, the permanent magnets 4a′ and 4b′ must be precisely, fixed to the inner wall of the yoke 1′ by adhesive, etc. Once fixed in place, it is difficult to adjust the position of the magnets 4a′ and 4b′ when assembling the drive shaft of the rotary drive apparatus to solenoid valve or the like.

Regarding the yoke 1′ itself, it is difficult to machine to the proper thickness the narrow portions 20′ and 21′ adjacent to the inner walls where the magnets 4a′ and 4b′ are to be mounted. The narrow portions must be machined with a high accuracy, because of their importance in defining the closed magnetic path characteristics.

Figure 4:
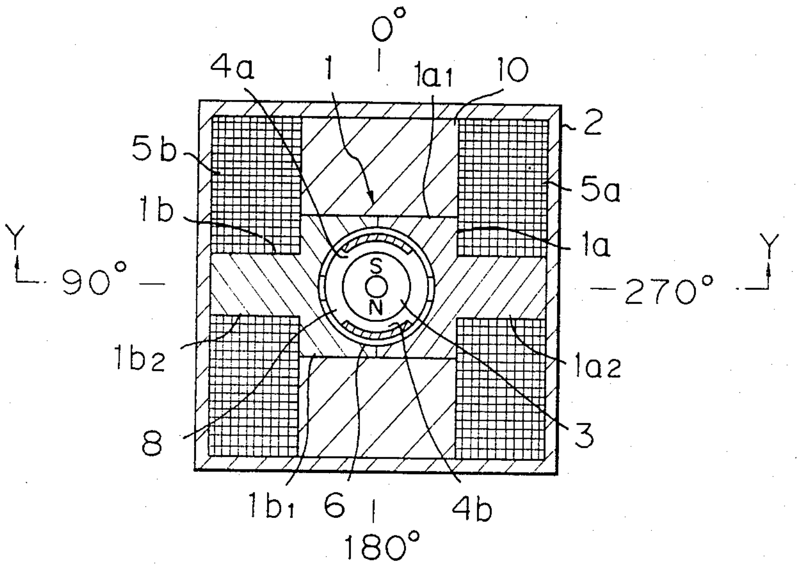
FIG. 4 is a plane sectional view of a rotary drive apparatus according to an embodiment of the present invention.
Figure 5:
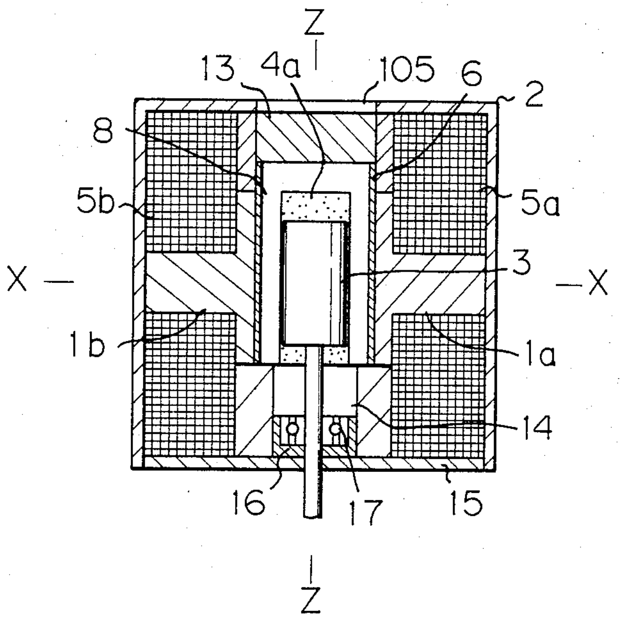
FIG. 5 is an elevational, sectional view of the rotary drive apparatus shown in FIG. 4, taken along line Y—Y of FIG. 4.
Figure 6:
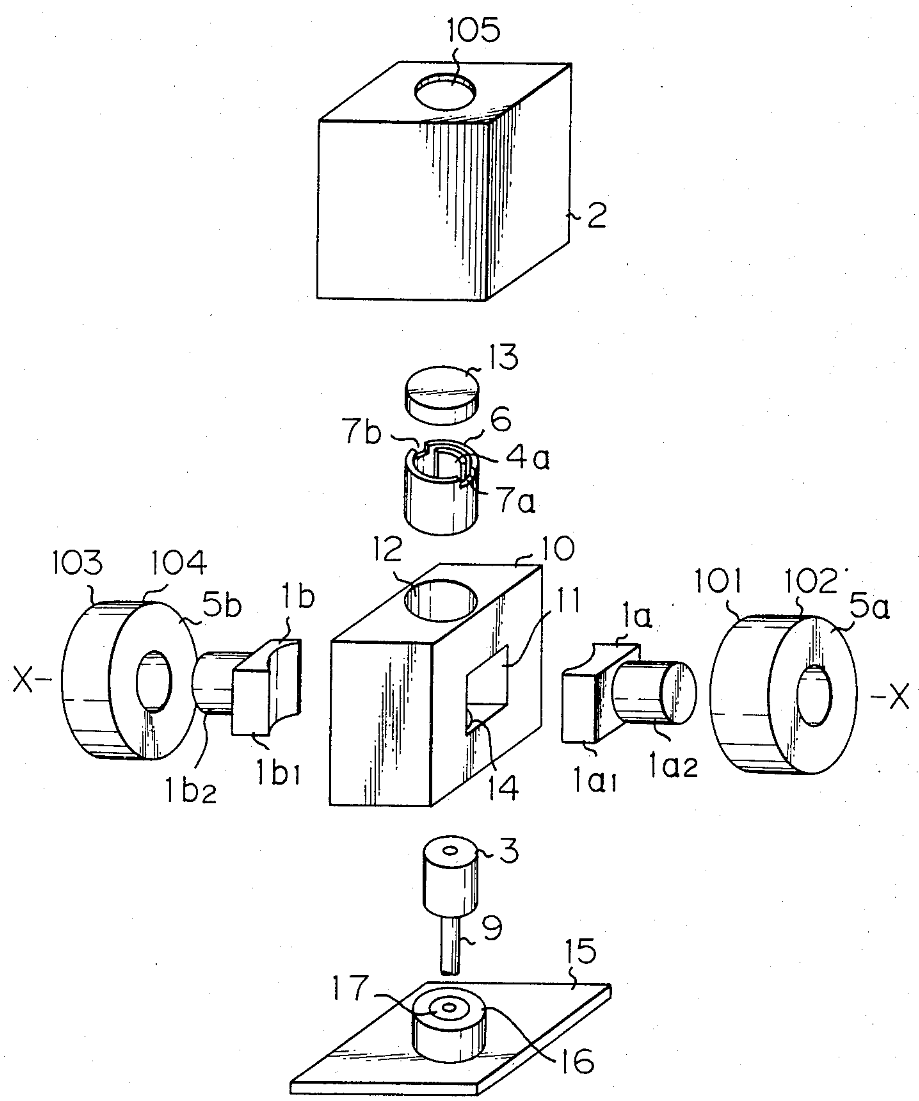
FIG. 6 is an exploded view of the rotary drive apparatus shown in FIG. 4.

Preferred embodiments of the present invention will now be explained. FIG. 4 is a plane sectional view of a rotary drive apparatus according to an embodiment of the present invention. FIG. 5 is an elevational sectional view of the apparatus taken along a line Y—Y in FIG. 4. FIG. 6 is an exploded view of the apparatus and FIG. 7 is a partially enlarged view of the apparatus.

The rotary drive apparatus includes a yoke 1, a cylindrical collar 6 of a ferromagnetic material, circular arc permanent magnets 4a and 4b, and a cylindrical rotor having S and N poles.

The yoke 1 consists of two half yokes 1a and 1b, each of which is made of a ferromagnetic material. The half yoke 1a incorporates a block portion $1a_1$ and a column portion $1a_2$. The block portion $1a_1$ is, on one face, cut away in the vertical direction (Z—Z) in a concave half circle. The column portion $1a_2$ is inserted into an inner hole of a coil 5a. The half yoke 1b also incorporates a block portion $1b_1$ and a column portion $1b_2$. The block portion $1b_1$ is also, on one face, cut away in the vertical direction (Z—Z) in a concave half circle. The column portion $1b_2$ is inserted into an inner hole of a coil 5b. When the half yokes 1a and 1b are joined together with the block portions $1a_2$ and $1b_2$ contacting each other, as shown in FIG. 4, a closed magnetic path is formed when the coils 5a and 5b are energized. The half circles of the block portions $1a_1$ and $1b_1$ together form a circular hole 8 in which can be inserted the collar 6 and the rotor 3, as shown in FIGS. 4, 6, and 7.

Figure 7:
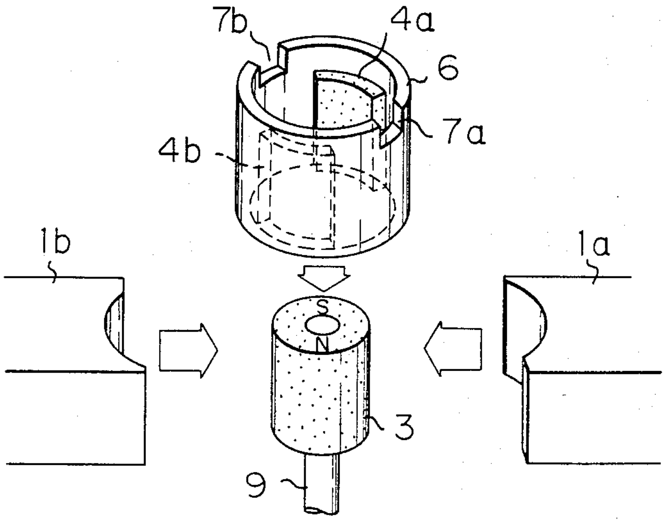
FIG. 7 is a partially enlarged view of the rotary drive apparatus shown in FIG. 4.

A pair of circular arc permanent magnets 4a and 4b are oppositely fixed on the inner wall of a collar 6 as shown in FIG. 7. A rotor 3 is positioned in the hole 8 defined by the collar 6 and the magnets 4a and 4b. Notches 7a and 7b are oppositely formed in the top end of the collar 6, and positioned in the direction between the magnets 4a and 4b, as shown in FIG. 7. The coils 5a and 5b are fixed in shape as shown in FIG. 6 by a resin, etc., for easy insertion of the column portions $1a_1$ and $1b_1$.

The rotary drive apparatus further includes a frame 10, a case 2, and a bottom plate 15. The frame 10 is made of a non-magnetic material and has holes 11, 12, and 14. The hole 11 is made in the lateral direction X—X and has a rectangular cross-section to receive the block portions $1a_1$ and $1b_1$ of the half yokes 1a and 1b. The hole 12 is made in a direction perpendicular to the lateral direction X—X and has a circular cross-section of a diameter approximately the same as that of the hole of the yoke 1 defined by the two half circles of the yokes 1a and 1b to tightly receive the collar 6. The hole 14 is made in the direction perpendicular to the lateral direction X—X concentric to the second hole 12 and also a circular cross-section. The hole 14 receives the rotor 3 and a bearing case 16 when the rotary drive apparatus is assembled. The bearing case 16 is fixed on the bottom plate 15 and accommodates a bearing 17 which enables the rotation of a drive shaft 9 connected to the rotor 3. The shaft 9 passes through the plate 15 to the outside of the apparatus and connects to a device to be driven (not shown). The case 2 accommodates the above-mentioned members and is of iron, steel or the like. The case 2 is provided with a hole 105 for passing coil leads (not shown) connected to coil terminals 101 to 104, and for adjusting the position of the collar.

The assembly of the rotary drive apparatus shown in FIGS. 4 and 5 will be explained with reference to FIG. 6. The permanent magnets 4a and 4b are fixed oppositely on the inner wall of the cylindrical collar 6 by an adhesive. The cylindrical collar 6 with the mounted magnets 4a and 4b is inserted into the hole 12 of the frame 10. The half yokes 1a and 1b are inserted into the hole 11 of the frame 10. The block portions 1a and 1b are brought in contact, whereby the cut-away portions of the block portions 1a and 1b contact the outer wall of the cylindrical collar 6, then are temporarily fixed. The coils 5a and 5b are mounted over the column portions $1a_2$ and $1b_2$ fixed to the yoke 1 by an adhesive or the like, and connected with lead wires for applying current thereto. The rotor 3 is then inserted into the hole 8, and the bearing case 16 inserted into the hole 14 until the plate 15 abuts the bottom of the frame 10. This enables easy emplacement of the rotor 3 in the predetermined space.

Now, the adjustment of the rotary position will be explained. The drive shaft 9, which is connected to the rotor 3 at one end, is first connected to the external device to be driven, for example, a position- or flow-controlling valve. With coils 5a and 5b not excited, a stationary position of the permanent magnets 4a and 4b against an initial position of the driven device is sought by rotating the collar 6 in the hole 12 of the frame 10, by means of a screwdriver, whose tip is inserted into the notches 7a and 7b. The collar 6 is then temporarily fixed to the frame 10. Next, the coils 5a and 5b are excited and the characteristics of the rotary drive apparatus with the connected driven device are obtained. The position of the collar 6 is readjusted if required. Finally, the collar 6 is fixed permanently by an adhesive.

After this adjustment, a bushing 13 is inserted into the hole 12 of the frame 10 to seal the hole 8. Finally, the case 2 is placed over the assembled components and joined to the bottom plate 15.

As clearly understood from the above, the rotary drive apparatus can be readily assembled and finely adjusted to the external driven device due to the construction of the frame 10, collar 6, half yokes 1a and 1b, etc. This reduces the cost of the rotary drive apparatus and at the same time enables highly accurate control for the driven device. Also, the cut-away portion of the half yokes 1a and 1b can be easily machined to a high precision.

The operation of the rotary drive apparatus will now be explained. In this apparatus, the permanent magnets 4a and 4b function as a magnetic return spring for the rotor 3 and also function as the magnetic permeance or resistance changing means. When the coils 5a and 5b are not energized, the rotor 3 is at rest with its N and S poles attracted by the S and N poles of the permanent magnets 4a and 4b, i.e., is at rest in the 0°–180° direction as shown in FIG. 4. When the coils 5a and 5b are positively energized, the electromagnetic force generated by the coils acts to rotate the rotor 3 counterclockwise in FIG. 4 until the electromagnetic torque applied to the rotor 3 through the yoke 1 equals the force of the magnets 4a and 4b. The exact rotation angle depends on the current applied to the coils. Upon removal of application of the current to the coils, the rotor 3 promptly returns to its initial position under the magnetic force from the permanent megnets 4a and 4b. When the coils 5a and 5b are negatively energized, the rotor 3 rotates clockwisely in FIG. 4. As is obvious, the principle of operation is the same as that of the rotary drive appratus shown in FIGS. 1 and 3. This means improved characteristics of the closed magnetic path in the yoke 1 as well as further reduced manufacturing cost.

Figure 8:
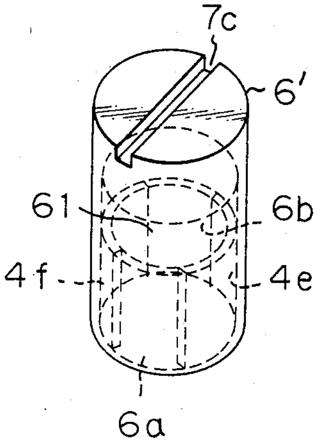
FIG. 8 is a perspective view of a collar used for the rotary drive apparatus in accordance with another embodiment of invention.

FIG. 8 is a perspective view of a collar 6′ built in the rotary drive apparatus in accordance with another embodiment of the present invention. The cylindrical collar 6′ is of non-magnetic material, such as aluminum, and includes a bore 61, a notch 7c, and inner circular projections 6a and 6b. The bore 61 has one open end and another closed end adjacent to the notch 7c. The rotor 3 shown in FIG. 7 can be inserted into the bore 61 and rotated. The notch 7c is used for rotating the position of the collar 6′ during adjustment of the apparatus to the external driven device. Permanent magnets or ferromagnetic members 4e and 4f are fixed between the inner projections 6a and 6b. The inner diameter between the opposed inner projections 6a and 6b is almost the same as that of the magnets 4e and 4f when they are mounted on the inner wall of the collar 6′, but is suitably designed to allow rotation of the rotor in the bore. This reduces the chances of detachment of the magnets 4e and/or 4f by degradation of the adhesive, etc., over time and, therefore, improves the reliability of the mechanism.

In order to improve the strength of the collar 6′, a non-magnetic ring (not shown) may be provided on the lower end.

Figure 9:
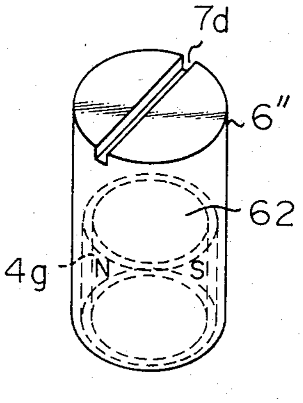
FIG. 9 is a perspective view of a collar used for the rotary drive apparatus in accordance with another embodiment of the present invention.

FIG. 9 is a perspective view of a collar 6″ built in the rotary drive apparatus in accordance with another embodiment of the present invention. The collar 6″ is of non-magnetic material and has a notch 7d and a bore 62. A cylindrical permanent magnet member 4g with N and S poles as shown in the figure is mounted on the inner wall of the collar 6″. This collar 6″ enables a reduced number of parts and simplifies the apparatus construction.

The permanent magnet member 4g can be replaced by circular ferromagnetic pieces having a shape similar to the members 4a and 4b shown in FIG. 7. Also, the collar 6″ can be made of ferromagnetic material.

The ring mentioned above may also be applied to the collar shown in FIG. 9.

Figure 10:
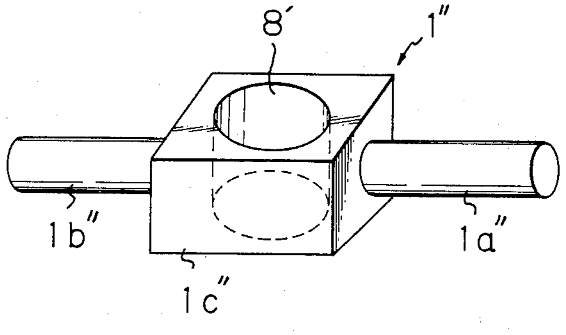
FIG. 10 is a perspective view of a yoke used for the rotary drive apparatus in accordance with still another embodiment of the present invention.

FIG. 10 is a perspective view of a yoke 1′ built in the rotary drive apparatus according to still another embodiment of the present invention. The yoke 1′ incorporates a center block portion 1c′ and column portions 1a′ and 1b′. A hole 8′ is made for inserting the collar 6, 6′, or 6″ mentioned above. The yoke 1′ has a shape similar to that shown in FIG. 2., however does not require high machining precision because of the use of the collar. Due to the collar, the main features of reduced production costs and easy adjustment of the present invention are maintained.

As clearly understood from the above, the elements 4a′ and 4b′ in FIG. 1, 4a and 4b in FIG. 4, 4e and 4f in FIG. 8 and 4g in FIG. 9 can be generally defined magnetic parameter changing members, because of they act as a magnetic resistance changing members or a magnetic permeance changing members.

While the present invention has been explained with reference to preferred embodiments, it is not limited thereto.

We claim:

1. A rotary drive apparatus comprising:

a frame having at least three holes;

yoke means having a center portion and two side bar portions on opposite sides of the center portion, the center portion having a hole;

coil means mounted on the side bar portions of the yoke means;

collar means having a bore and being tightly mounted on the surface of the hole of the yoke means;

magnetic parameter changing means being mounted on the surface of the bore of the collar means; and rotor means having magnetic poles in the radial direction and being inserted into the bore of the collar means with a predetermined clearance;

wherein a first hole of the frame is parallel to a first direction of the apparatus and has a cross-section for tightly receiving the center portion of the yoke means;

second and third holes of the frame are in a second direction perpendicularly intersecting the first direction and being concentric with each other oppositely the first hole;

the center portion of the yoke means being fit into the first hole;

the position of the collar means is adjusted through the second hole, during the adjustment, and the third hole passes a shaft connected to one end of the rotor means.

2. A rotary drive apparatus according to claim 1, wherein said collar means is a cylindrical member of ferromagnetic material and has a notch at one end for adjusting the position of the collar means in the hole of the yoke means.

3. A rotary drive apparatus according to claim 1, wherein the magnetic parameter changing means partially circular permanent magnets comprises and provides electromagnetic return spring to the rotor means.

4. A rotary drive apparatus according to claim 1, wherein the magnetic parameter changing means is a cylindrical member which is tightly fixed on the inner wall of the bore of the collar means and has magnetic poles in the radial direction.

5. A rotary drive apparatus according to claim 1, wherein said collar means is a cylindrical member of non-magnetic material and has at least one notch at the top for adjusting the position of the collar means in the hole of the yoke means.

6. A rotary drive apparatus according to claim 5, wherein the magnetic parameter changing means comprises two partially circular permanent opposite magnets and provides electromagnetic return spring to the rotor means.

7. A rotary drive apparatus according to claim 5, wherein the magnetic parameter changing means comprises two partially circular members of ferromagnetic material.

8. A rotary drive apparatus according to claim 1, wherein said collar means is made of ferromagnetic material, has one end of the bore opened to insert the magnetic parameter changing means and the rotor means and the other end closed, and has a notch at the other end for adjusting the position of the collar means in the hole of the yoke means.

9. A rotary drive apparatus according to claim 8, wherein the magnetic parameter changing means comprises partially circular permanent magnets and provides electromagnetic return spring to the rotor means.

10. A rotary drive apparatus according to claim 8, wherein the magnetic parameter changing means is a cylindrical member which is tightly fixed on the inner wall of the bore of the collar means and has two permanent magnetic poles in the radial direction.

11. A rotary drive apparatus according to claim 1, wherein said collar means is a cylindrical member of non-magnetic material and has a hole, one end of which is opened to insert the magnetic parameter changing means and the rotor means and the other end being closed, and has a notch at the end.

12. A rotary drive apparatus according to claim 11, wherein the magnetic parameter changing means comprises partially circular permanent magnets and provides electromagnetic return spring to the rotor means.

13. A rotary drive apparatus according to claim 11, wherein the magnetic parameter changing means is a cylindrical member which is tightly fixed on the inner wall of the bore of the collar means and has permanent magnetic poles in the radial direction.

14. A rotary drive apparatus according to claim 1, wherein said collar means is a cylindrical means of ferromagnetic material having oppositely placed projections incorporated with the inner wall of the pipe and has at least one groove at one end for adjusting the position of the collar means in the hole of the yoke means.

15. A rotary drive apparatus according to claim 14, wherein the magnetic parameter changing means comprises partially circular oppositely magnetized permanent magnets, each of which is inserted between the inner projections of the collar means.

16. A rotary drive apparatus according to claim 14, wherein the magnetic parameter changing means comprises partially circular ferromagnetic material, each of which is inserted between the inner projections of the collar means.

17. A rotary drive apparatus according to claim 1, wherein said yoke means comprises a first half yoke, having a first half center portion and a first column portion, and a second half yoke, having a second half center portion and a second column portion, each of said first and second half center portions having a half circle cutaway portion with a radius approximately equal to the outer radius of the collar means and two tips, each of which has a shape ensuring the closed electromagnetic path in the yoke means, the joined first and second half yokes comprising the center portion of the yoke means and the first and second column portions comprising the two side bar portions.

18. A rotary drive apparatus according to claim 17, wherein said first and second half center portions have the same rectangular cross-sections and the first hole of the frame has a rectangular cross-section for tightly receiving the first and second half center portions.

19. A rotary drive apparatus according to claim 1, wherein the center portion of said yoke means is shaped as a block and the two side bar portions are shaped as columans and wherein the first hole of the frame has a rectangular cross-section for tightly receiving the center portion of the yoke means.

20. A rotary drive apparatus according to claim 1, further comprising a case and a bottom plate made of magnetic material and accommodating the frame, the yoke means inserted into the frame, the collar means inserted into the hole of the yoke means, the magnetic parameter changing means mounted on the inner wall of the collar means, and the rotor means inserted in the magnetic parameter changing means, the case having a hole for adjusting the position of the collar means, concentric to the hole of the first hole of the frame, and further comprising bearing means supporting the shaft connected to the one side of the rotor means, mounted on the one side of the plate and being tightly inserted into the third hole of the frame whereby the rotor is suitably placed for rotation in the bore of the collar means.

* * * * *

UNITED STATES PATENT AND TRADEMARK OFFICE

CERTIFICATE OF CORRECTION

PATENT NO. : 4,533,847

DATED : August 6, 1985

INVENTOR(S) : IDOGAKI et al

It is certified that error appears in the above-identified patent and that said Letters Patent is hereby corrected as shown below:

Assignee is incomplete. Should read:

--Nippon Soken, Inc., and
Toyota Jidosha Kabushiki Kaisha--

Signed and Sealed this

*Eighteenth* Day of *February 1986*

[SEAL]

*Attest:*

DONALD J. QUIGG

*Attesting Officer* *Commissioner of Patents and Trademarks*